(12) United States Patent
Safinya et al.

(10) Patent No.: US 7,633,296 B2
(45) Date of Patent: Dec. 15, 2009

(54) RECEIVERS AND METHODS FOR ELECTROMAGNETIC MEASUREMENTS

(75) Inventors: Kambiz Safinya, Garches (FR);
Edward Nichols, Berkeley, CA (US);
Kamal Babour, Bures sur Yvette (FR);
Philip Heelan, County Clare (IE);
Christian Besson, Le Pecq (FR)

(73) Assignee: WesternGeco L.L.C., Houston, TX (US)

( * ) Notice: Subject to any disclaimer, the term of this patent is extended or adjusted under 35 U.S.C. 154(b) by 139 days.

(21) Appl. No.: 11/694,179

(22) Filed: Mar. 30, 2007

(65) Prior Publication Data
US 2008/0238429 A1 Oct. 2, 2008

(51) Int. Cl.
*G01V 3/00* (2006.01)
(52) U.S. Cl. ...................... 324/347; 324/365
(58) Field of Classification Search .................. 324/347, 324/365, 457, 458, 690, 348, 349, 357; 343/709, 343/710, 718, 719, 720; 702/64, 65, 127
See application file for complete search history.

(56) References Cited

U.S. PATENT DOCUMENTS

| 4,617,518 | A | 10/1986 | Srnka | |
|---|---|---|---|---|
| 4,633,182 | A | 12/1986 | Dzwinel | |
| 2008/0094067 | A1* | 4/2008 | Constable et al. | 324/365 |

FOREIGN PATENT DOCUMENTS

| GB | 2070345 | | 9/1981 |
|---|---|---|---|
| JP | 2003298343 | A | 10/2003 |
| RU | 2150169 | * | 3/1999 |
| RU | 2150169 | C1 | 5/2000 |
| SU | 1125577 | * | 11/1984 |
| SU | 1125577 | A | 11/1984 |
| WO | WO02/14906 | | 2/2002 |
| WO | 2006026361 | A1 | 3/2006 |

OTHER PUBLICATIONS

Boerner, David E. et al., Orthogonality in CSAMT and MT Measurements, Geophysics, vol. 58, No. 7, Jul. 1993, pp. 924-934.
Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.

(Continued)

*Primary Examiner*—Kenneth J Whittington
(74) *Attorney, Agent, or Firm*—Dan C. Hu; Ling Gang (Mark) Ye; Jeffrey E. Griffin (57) ABSTRACT

A receiver for electromagnetic measurements includes a polyhedron structure having m faces, where $m \geq 4$ and $m \neq 6$: n electrodes each disposed on one face of the polyhedron structure, wherein $3 \leq n \leq m$; and at least one circuitry connected to the n electrodes for signal measurement. A method for electromagnetic measurements includes obtaining a plurality of electric current measurements using a plurality of electrodes each disposed on a surface of a polyhedron receiver, wherein the plurality of electric current measurements comprise at least three different measurements; and determining electric field components in a three dimensional space from the plurality of electric current measurements by using a number of matrices that correlate orientations of surfaces of the polyhedron receiver to a coordinate system in the three dimensional space.

16 Claims, 7 Drawing Sheets

OTHER PUBLICATIONS

Chave, Alan D. et al., Electrical Exploration Methods in Applied Geophysics Volume 2, Electrical Exploration Methods for the Seafloor, Chapter 12, 1991, pp. 931-966.

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications.

Evans, Rob L. et al., On the Electrical Nature of the Axial Melt Zone at 13 Degrees N On the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons.

Kaufman, A. et al., Methods in Geochemistry and Geophysics, 16.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

MacGregor, L. et al., The Ramesses Experiment—III. Controlled-Source Electromagnetic Sounding of the Reykjanes Ridge . . . , Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 1990, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, MARELEC 1999.

Maurer, Hansruedi et al., Optimized Design of Geophysical Experiments, SEG Paper.

Grant, I.S. et al., Electromagnetic Waves, Chapter 11, pp. 365-407.

PCT Search Report, dated Nov. 14, 2008, for Application No. PCT/US2008/058615.

* cited by examiner

RECEIVERS AND METHODS FOR ELECTROMAGNETIC MEASUREMENTS

FIELD OF THE INVENTION

The present invention relates to methods and apparatuses for imaging subsurface resistivities. Particularly, the present invention relates to receivers for electromagnetic surveys.

BACKGROUND OF THE INVENTION

During exploration and reservoir assessment and development in the oil and gas industry, hydrocarbons, such as oil and gas, as well as geological structures that tend to bear hydrocarbon, may be detected based on their properties (e.g., mechanical and electromagnetic (EM) properties) that are different from those of the background geological formations.

Electromagnetic (EM) measurements are commonly used in oil and gas exploration. Among the EM properties, the resistivity ($\rho$), which is an inverse of the electrical conductivity ($\sigma$), is particularly useful. This is because hydrocarbon-bearing bodies, such as oil-bearing reservoirs, formations containing methane hydrate, and gas injection zones, have higher resistivities compared with their background geological formations. For example, hydrocarbon-bearing reservoirs typically have resistivities one to two orders of magnitude higher than those of the surrounding shale and water-bearing zones. Therefore, resistivity mapping or imaging may be useful in locating zones of interest in contrast to the background resistivity. This method has been used successfully in both land and seafloor exploration.

Resistivity mapping may be achieved by generating an EM signal above the formations of interest and receiving the resulting EM field at selected locations. The received data is affected by a number of parameters, for example, the distance between the EM signal source and the receivers. EM field frequency, polarity of the EM waves, depth and thickness of the reservoir, resistivity of the hydrocarbon bearing zones, and the surrounding geological formations. In marine applications, the received signal may depend on the resistivity of the seawater, which may be a dynamic variable that depends on the water temperature, salt content, etc.

The EM signal may be from natural sources or from artificial sources. Among the EM methods, magneto-telluric (MT) methods rely on the naturally-occurring EM fields in the stratosphere surrounding the earth. Because carbonates, volcanics, and salt all have large electrical resistivity as compared with typical sedimentary rocks, MT measurements may produce high-contrast images of such geostructures. MT measurements are particularly useful in examining large-scale basin features and for characterizing reservoirs below basalt (volcanics) layers beneath a sea bed.

Controlled source electromagnetic ("CSEM") methods use EM transmitters, called sources, as energy sources, and the receivers measure the responses of the geological structures to the transmitted signals. The transmitter may be a direct current (DC) source, which injects a DC current into the geological formations. DC currents are typically injected into the formations using contacting electrodes. Recent EM measurement methods use EM sources that produce time-varying electrical and/or magnetic (EM) fields. The EM fields may be a pulse generated by turning on and off an EM transmitter, and in this case, the receivers effectively measure a pulse response of the geological structures. EM measurements may use a transmitter that transmits a fixed frequency or a range of frequencies. The higher frequency EM sources permits resolution of finer structures, whereas the lower frequency EM sources allows one to probe deeper into the formations.

In marine explorations, low-frequency EM methods are typically used. The low-frequency EM waves may induce a current, i.e., the Faraday (eddy) current, to flow in the earth formation and in the sea water. The current density depends on the impedance of the earth formation and the sea water. A voltage drop across two locations produced by the current may be measured and used to infer the resistivity distribution in the formation. Alternatively, one may measure the secondary magnetic fields produced by the induced current.

Figure 1:
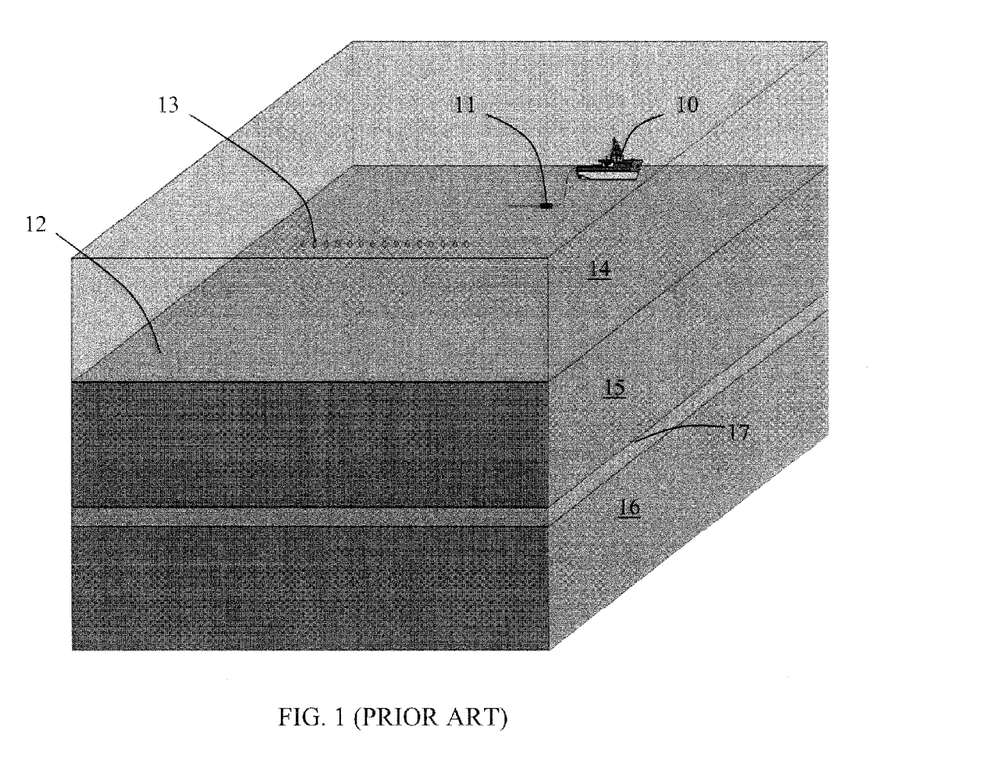
FIG. 1 shows a conventional controlled source electromagnetic measurement system.

As discussed, CSEM uses an artificial EM source to generate controlled EM fields that penetrate the ocean and the subsea formations. As illustrated in FIG. 1, in a conventional CSEM method, an electrical dipole transmitter 11 is towed by a ship 10 at a short distance above the seabed 12. The transmitter 11 induces EM fields in the sea water 14, geological layers 15 and 16 and the oil-bearing layer 17.

To detect the EM signals, a number of receivers 13 are deployed on the seabed 12. The EM signals measured by the seafloor receivers 13 may then be used to solve an inverse problem to estimate the resistivity distributions in the geological structures, including layers 15, 16, and 17. When the transmitter 11 is not used, the receivers 13 may be used to detect EM signals induced by the naturally-occurring MT fields.

Figure 2:
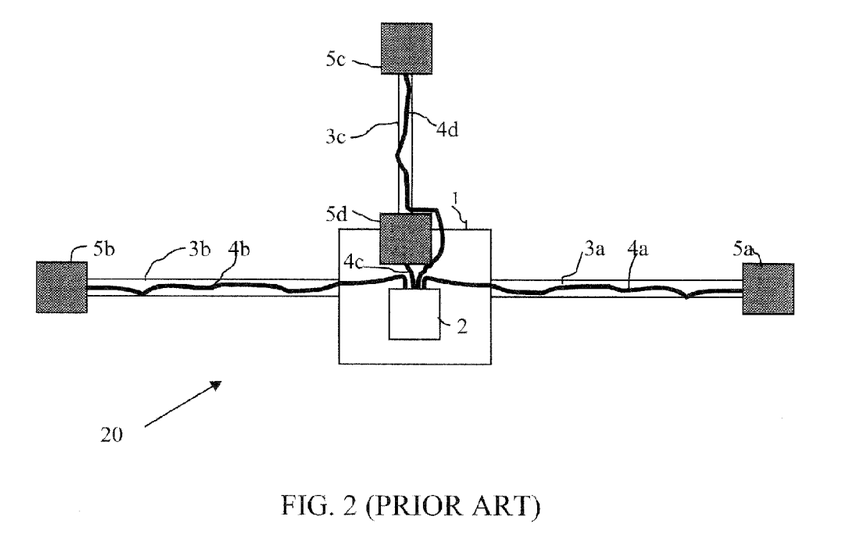
FIG. 2 shows a prior art receiver including four electrodes for measuring the electric field by measuring the voltage drop across the opposing electrodes.

A typical structure of a traditional receiver 20 is illustrated in FIG. 2. As shown, the receiver 20 typically has a body (frame) 1 with arms 3a, 3b, and 3c attached thereto. At the end of each arm 3a, 3b, or 3c is an electrode 5a, 5b, or 5c, as well as an electrode 5d located near the receiver frame 1, which are for detecting the electrical field signals. In addition, a receiver typically includes two additional horizontal electrodes (not shown) that are orthogonal to electrodes 5a and 5b. Typically the receiver structure can accommodate magnetic field sensors as well. These may or may not be integrated into the arms 3a, 3b or 3c. The receiver frame 1 encloses the receiver circuitry 2. The circuitry 2 connects, through electrical cables 4a, 4b, 4c, and 4d, to electrodes 5a, 5b, 5c, and 5d. The cables 4a, 4b, 4c, and 4d may be enclosed in protecting enclosures forming the "arms" 3a, 3b, and 3c. The arms are typically made of insulating materials, such as plastic. The electrodes 5a, 5b, 5c, and 5d are typically made of sandwiched Ag—AgCl. Because these electrodes need to be in direct contact with sea water, they need constant maintenance to prevent problems arising from corrosion.

The electrodes are used in pairs to measure different components of the electrical fields. The electric field is traditionally measured as the voltage drop V between two opposing electrodes. For example, the transverse component of the electric field is measured by the dipole configuration formed by electrodes 5a and 5b in the horizontal direction, and the vertical component of the electric field is measured by the dipole configuration formed by electrodes 5c and 5d in the vertical direction. Although not depicted, it is also common to measure the electric field in a direction that is perpendicular to the electrodes 5a-5b and the electrodes 5c-5d. Such a direction would be into the page in FIG. 2. Further, it is also common to include magnetic field sensors to measure the magnetic field intensity, typically in orthogonal directions.

For the same electric field E, the detected voltage V would be larger if the distance d between the opposing electrodes is larger because V=d E. However, it is impractical to increase d beyond a certain limit for the purpose of increasing the sensitivity of the measurements. This is because it will be more difficult to transport and deploy large-sized arms, and the reliability of the receivers also suffers. On the other hand, the arms cannot be too short because the receiver needs to have sufficient sensitivity for EM fields, especially in the low frequency regime, e.g., between 0.02 Hz and 10 Hz. The lengths of the arms 3a and 3b supporting the electrodes 5a and 5b in a typical receiver are around 4 meters, and the vertical arm 3c is typically extended about 2 meters from the frame 1.

Due to the large size of the receivers, these electrode arms and the receiver body (frame) are usually transported as separate components and assembled before deployment. The assembling of the receivers is a very time consuming process during an operation. In addition, frequent connecting and disconnecting the electrodes, arms and cables from the receiver circuitry may lead to reliability and sensitivity problems. Recent designs of these type of receivers have attempted to partially address the problem by designing flexible arms which may be folded during storage or transport but which are unfolded prior to deployment for sea bottom measurements. Finally, in order to measure the low frequency EM fields, the electrodes are required to be non-polarizable, typically Ag—AgCl electrodes. This presents a technical challenge to make sensitive receivers.

The receiver sensitivity determines the sensitivity of an EM survey. The resolution of the survey image may also be affected by the receiver sensitivity. A major source of noises in the receiver 20 is the bandwidth limited Johnson noises of the receiver circuitry 2. State-of-the-art receivers can achieve a noise level of 1 $nV/\sqrt{Hz}$ or better at the input stage to the receiver circuitry 2. If all other sources of noise are properly managed, the total noise level of the receiver 20 may be controlled to a level of around 100 $pV/ml\sqrt{Hz}$ for the transverse electric field component and around 300 $pV/m/\sqrt{Hz}$ for the vertical electric field component. This sensitivity determines the limit of how sensitive the EM survey will be to deeply buried structures within the subsurface and in general the resolution and fidelity of any image derived therefrom.

Improvement of the receiver sensitivities is limited by the impedance of the input stage of the receiver circuitry 2 and by the noise generated in the antenna electrodes 5a, 5b, 5c, and 5d. In addition, the long arms 3a, 3b, and 3c supporting the electrodes 5a, 5b, 5c are subject to vibrations induced by sea currents, and may even resonate acoustically. Such vibration or resonance significantly increases the noise level.

Due to the technical difficulties in measuring the electric fields by voltage drops, it may be more advantageous to measure an electric field E by measuring electric current densities J and the electric conductivity σ of the sea water. The electric field E may then be derived using the Ohm's law, $$E=J/\sigma, \quad (1)$$

where J is the current density, and σ is the electric conductivity. This principle has been applied to measuring electric fields using opposing conductive plates in a cubic or rectangular receiver frame, as taught in French Patent 8419577, issued to Jean Mosnier, and in WO 2006/026361 by Steven Constable. This French Patent and the WO 2006/026361 are incorporated by reference in their entireties. One example of such a receiver is illustrated in FIG. 3.

Figure 3:
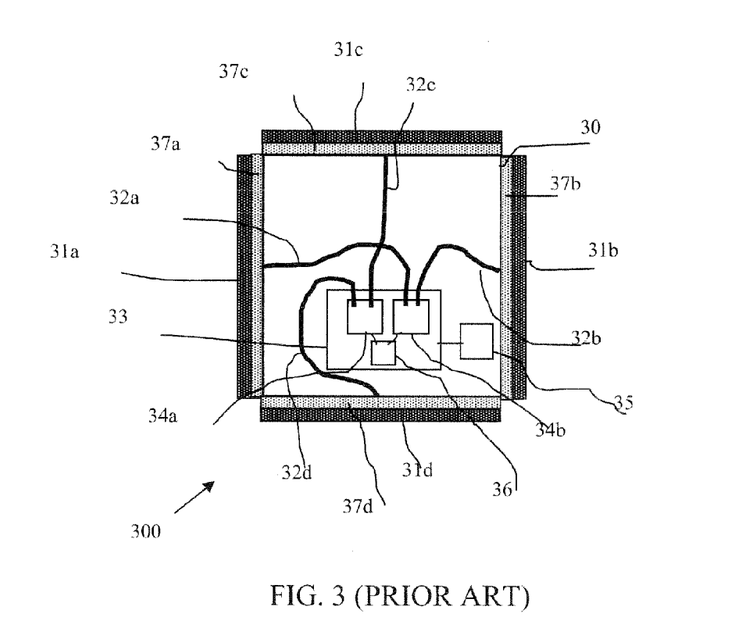
FIG. 3 shows a prior art receiver having a cubic frame for measuring the electric field through the electric current measurement.

As shown in FIG. 3, a receiver 300 includes conductive plate electrodes 31a, 31b, 31c, and 31d attached to the outside surfaces of the cubic receiver frame 30. These conductive plates are insulated on the sides 37a, 37b, 37c, and 37d facing away from the sea water. Electrodes 31a and 31b are connected to a coupling device 34b via cables 32a and 32b, respectively. Similarly, electrodes 31c and 31d are connected to a coupling device 34a via cables 32c and 32d, respectively.

An electric current in the horizontal direction will flow into electrode 31a, through cable 32a and coupling device 34b, and then out of electrode 31b back to the water. The current density in the horizontal direction defined by electrodes 31a and 31b can then be measured by the measurement circuitry. Similarly, an electric current density in the vertical direction defined by electrodes 31c and 31d may also be measured by the measurement circuitry. In addition, an electric current density in the third orthogonal direction may be measured by using a third pair of electrodes (not shown) outside the receiver box 30. The coupling devices 34a and 34b couple the current flows to the electronic circuitry 36. The electronic circuitry 36 amplifies the currents and feed the signals to the rest of the measurement circuitry.

While these prior art receivers have been useful in oil and gas exploration there remains a need for better receivers that are easy to use and can provide robust measurements.

SUMMARY OF INVENTION

In one aspect, the present invention relates to receivers for electromagnetic measurements. A receiver in accordance with one embodiment of the invention includes a polyhedron structure having m faces, wherein $m \geq 4$ and $m \neq 6$; n electrodes each disposed on one face of the polyhedron structure, wherein $3 \leq n \leq m$; and at least one circuitry connected to the n electrodes for signal measurement.

In another aspect, the invention relates to receivers for electromagnetic measurements. A receiver includes a polyhedron structure having m faces, wherein m=6 and the polyhedron structure is an irregular polyhedron structure with one side having a length different from a length of another side; n electrodes each disposed on one face of the polyhedron structure, wherein $3 \leq n \leq m$; and at least one circuitry connected to the n electrodes for signal measurement.

In another aspect, the present invention relates to methods for electromagnetic measurements. A method includes obtaining a plurality of electric current measurements using a plurality of electrodes each disposed on a surface of a polyhedron receiver, wherein the plurality of electric current measurements comprise at least three different measurements; and determining electric field components in a three dimensional space from the plurality of electric current measurements by using a number of matrices that correlate orientations of surfaces of the polyhedron receiver to a coordinate system in the three dimensional space.

In another aspect, a receiver for electromagnetic measurements includes a polyhedron structure having a plurality of faces, and a plurality of electrodes each disposed on a face of the receiver. None of the faces of the polyhedron are substantially parallel to another face of the receiver.

Other aspects and advantages of the invention will be apparent from the following description and the appended claims.

DETAILED DESCRIPTION

The present invention relates to methods and apparatus for EM exploration, particularly in subsea oil and gas exploration. Apparatus in accordance with embodiments of the invention can provide electric field measurements by measuring electric current densities. In particular, the present disclosure provides receivers having polyhedral shapes for the EM measurements. EM measurement is used in its broad sense in this description to include measurements of electric, magnetic, or a combination of the electric and magnetic fields.

As noted above, conventional receivers for EM measurements are based on detectors that are arranged in orthogonal orientations to provide measurements of EM components in different directions. These detectors are disposed on arms extended from a central frame or directly disposed on a central frame. While such basic configurations can provide measurements in orthogonal directions in a relatively simple manner, there is no convenient way to correct errors arising from imperfect alignment or movement/vibration of the detectors.

The receivers disclosed by Mosnier measure electric current densities instead of voltage drops. While such receivers are more immune to environmental effects (e.g., sea currents and movement/vibration of the electrodes), these receivers still rely on pre-arranged orthogonal relationship of the electrodes. Any imperfection in the electrode alignment cannot be easily corrected.

Receivers in accordance with disclosed examples may not rely upon a pre-arranged orthogonal configuration of the electrodes to provide measurements of separate EM components in different directions. That is, the detectors on a receiver of the invention may be arranged in orthogonal or non-orthogonal configurations. Not being confined to orthogonal configurations, receivers may not necessarily have a cubic central frame, which are typically found in traditional receivers. As such, a receiver may adopt a general polyhedron shape.

Figure 4:
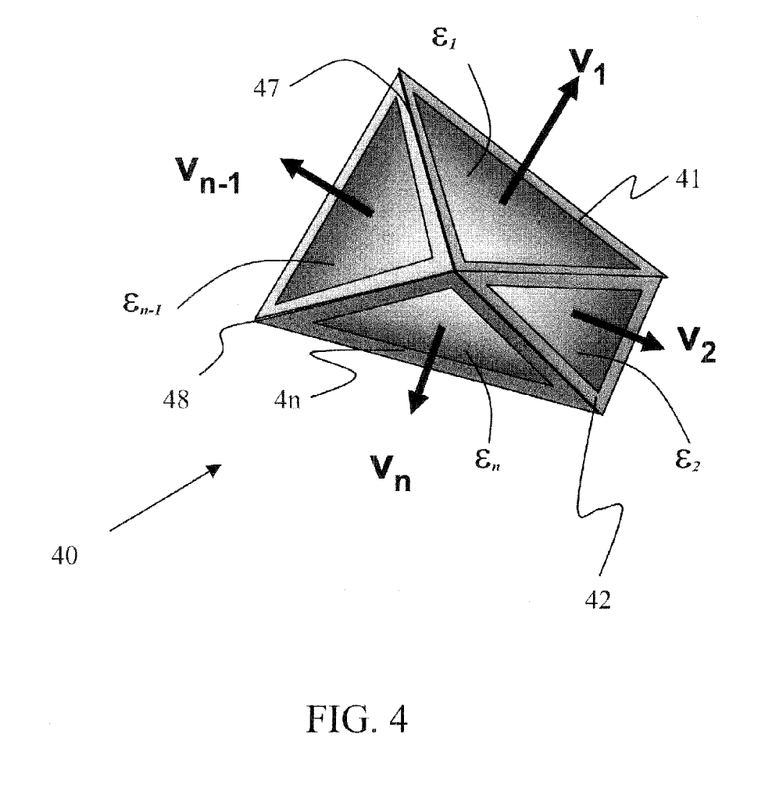
FIG. 4 shows one example of a polyhedron-shaped receiver.

FIG. 4 shows an example of a receiver with a polyhedron shape with an order of n, i.e., with n faces. Note that the polyhedron may be a regular polyhedron or an irregular polyhedron because the methods of EM measurements do not rely on any presumed alignment or relative configuration of the electrodes.

In a polyhedron, each of the faces 41, 42, . . . , 4n is characterized by its normal unit vector $v_1, v_2 \ldots v_n$, respectively. Each face has an electrode $\epsilon_1, \epsilon_2, \ldots, \epsilon_n$ disposed thereon. In accordance with some embodiments of the invention, the faces 41, 42, . . . , 4n may be made of an suitable material, such as rigid plastic, polymers, or a metal with proper insulation, to electrically insulate individual electrodes $\epsilon_1, \epsilon_2, \ldots, \epsilon_n$. In other embodiments, only the edges 47, which form a frame of the polyhedron, are made of an insulating material. The edges are adjoined at vertices 48. In this case, the electrodes $\epsilon_1, \epsilon_2, \ldots, \epsilon_n$ may encompass part of or entire faces of the polyhedron. It is noted that the receiver 40 may include an electrode on the bottom face (not shown).

In one example, the polyhedron is sealed such that water does not get inside the polyhedron. In other examples, water may be allowed to fill the inside of the polyhedron and between electrodes.

Using the example receiver shown in FIG. 4, the current density $\vec{\vartheta}_i$ as measured by the $i^{th}$ electrode may be described as:

$$\vec{\vartheta}_i = -J \cdot v_j \quad (2)$$

The current I, entering the $i^{th}$ electrode is the current density $\vec{\vartheta}_i$ times the area $A_i$ of the $i^{th}$ electrode:

$$I_i = \vec{\vartheta}_i A_i \quad (3)$$

In the above expression, a convention is adopted such that a positive current always enters the electrode.

To simplify the calculation of the measurements, in one example, a receiver may be constructed such that the effective impedance of the receiver is equal to the resistance of the sea water displaced by the receiver. In this case, the deployment of the receiver will have minimal or no perturbation of the electric field to be measured. Therefore, the perturbation in the current density due to the existence of the receiver will be negligible. With such a receiver, the measurement data may be analyzed under the assumption of negligible perturbation, i.e., negligible perturbations assumption (NPA).

While a receiver meeting the negligible perturbation assumption can simplify data analysis, other examples of receivers may be designed to have some perturbation. The effective impedance of a receiver may be adjustable in order to enhance the current density detected by the electrodes. Such a receiver may perturb the electric field when deployed on a sea floor. The perturbation may be corrected when processing the data. Any suitable correction approach known in the art may be used for such correction. For example, U.S. Patent Publication No. 2009/0001985, entitled "Methods for Electromagnetic Measurements and Correction of Non-Ideal Receiver Responses," by Besson et al., filed Jun. 29, 2007, discloses data correction using a correction factor, a transform function, or modeling. This application is incorporated by reference in its entirety.

Correction factors to be used in such corrections may be derived from calibration of the receivers using known signals (e.g., using a reference electric field). Transform functions for such corrections may be derived from modeling of the receiver responses. In addition, correction of non-ideal receiver responses may be accomplished with modeling using a model that take into account of the receivers and the environments. For example, the receivers (including their locations, orientations, etc.) may be treated as elements in the formation model (e.g., a conductive layer in a layered-earth model).

The electrodes on a polyhedron receiver may be connected with circuits similar to that shown in FIG. 3. FIG. 5A shows an example schematic illustration of general circuitries in an n order polyhedral receiver for measuring the current densities. A total number of n electrodes, $\epsilon_1, \epsilon_2, \ldots, \epsilon_n$ are each connected to vertices $v_1, v_2, \ldots, v_n$ through circuits $c_1, c_2, \ldots, c_n$. The circuits $c_1, c_2, \ldots, c_n$ may minimize the impedance between the electrodes and vertices. Alternatively, the circuits $c_1, c_2, \ldots, c_n$ may provide means to adjust the impedance (for example, so that the NPA holds). In addition, the circuits $c_1, c_2, \ldots, c_n$ may output voltages at output terminals $S_1, S_2, \ldots, S_n$ that are proportional to the current I, entering the corresponding electrode.

Figure 5:
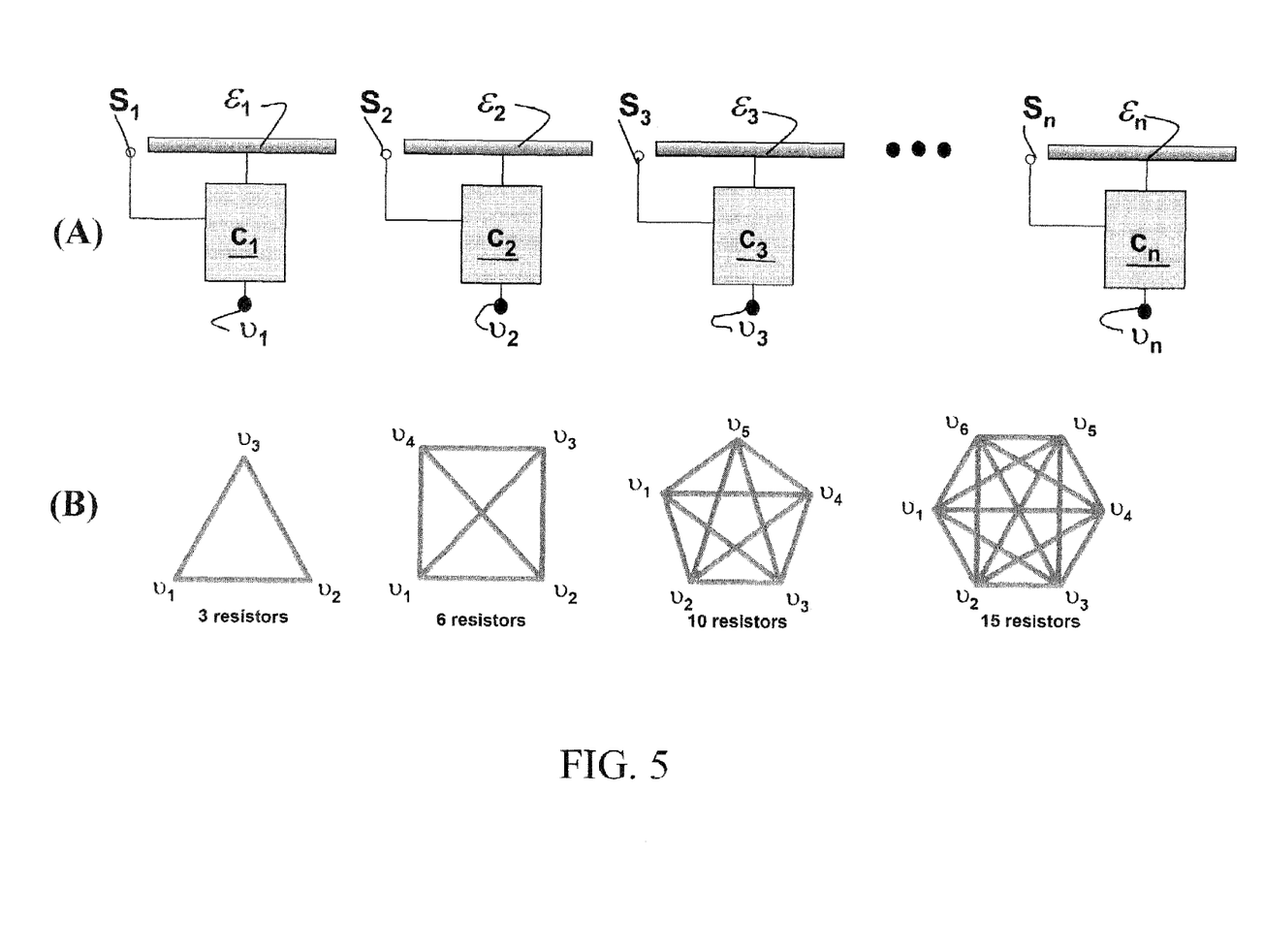
FIG. 5A shows examples of circuits for measuring signals from electrodes on a polyhedron receiver.
FIG. 5B shows schematic illustrating various example resistor networks for different polyhedron receivers.

FIG. 5B shows illustrations of resistor networks in various polyhedral receivers. The diagrams represent resistor networks with the straight lines connecting the vertices $v_i$ representing resistors. For a polyhedron of order n, the number of resistors in the network is $n(n-1)/2$. If the polyhedron is a regular polyhedron, then the resistors may be equal in value. For example, in the simplest polygon, a triangle, of FIG. 5, the resistances between any pair of the three vertexes $v_1$, $v_2$, and $v_3$, are of equal values. Similarly, other regular polyhedrons may also have equal values of resistances between their vertexes.

The signals are measured in term of voltage $S_i$, given by $$S_i = Z_i I, (I=1, 2, \ldots, n) \tag{4}$$

where $Z_i$ is the effective transimpedance between the output of $c_1$ and $\epsilon_1$ in units of ohms.

Note that the $S_i$ signals measured by the electrodes on a polyhedron receiver are each measured by an electrode facing a specific orientation defined by a surface of the polyhedron. To derive the current density J in a three-dimensional space, the measured signals $S_i$, may be transformed using matrices that correlate the orientations of the polyhedron surfaces with a three-dimensional coordinate system (e.g., a Cartesian system), such as:

$$J = M^{-1} \theta, \tag{5}$$

where $\theta$ is a 3D spatial vector whose components are combinations of elements of the vector $\vartheta_i$ defined in equation (2), of rank n taken 3 at a time, and M is a 3×3 matrix given by:

$$M_{i,s} = -v_{j,r}$$

where $i \in [j,k,l]$ and $\{j,k,l\}$ are combinations of n integers (1, 2, . . . , n) taken 3 at a time, and r takes the values, x,y,z (i.e., the three Cartesian axes).

This means for a receiver having a polyhedron configuration including n electrodes, there are ${}^nC_3 = n!/(n-3)!3!$ different matrices M, which in turn means there are ${}^nC_3$ ways to derive the current density J. This allows one to use the difference of the measurements of J as a means to control spurious errors which may arise from the plate geometry of the receiver, calibration errors, motions, etc. Alternatively, all measured J values may be used in statistical analysis to identify or reduce measurement errors, or the measured J values may be averaged to minimize any impact from the errors that may result from the variations in the plate geometry, calibrations, and motions, etc.

In some examples, each of the n faces may have one or no electrode. In the case that the $i^{th}$ face has no electrode, it may be expressed as $A_i = 0$. In this case, those matrices M that include elements from the $i^{th}$ face would be singular matrices, and cannot be used for deriving the expression of the current density J. The negligible perturbation assumption will not hold in this case, and correction may be required for the expression of the current density J.

After solving the expression of the current density J, the electric field E may be readily obtained based on J and the conductivity $\sigma$ of the sea water, using Ohm's law, i.e., equation (1).

The receivers and measurement methods described above are with reference to a general polyhedron receiver having an order of n, i.e., n faces. Examples of the invention will now be illustrated with a specific receiver, a tetrahedron receiver. The lowest order polyhedron in 3 dimensions is a tetrahedron (an order of 4), and the minimum number of electrodes needed is 3, where one face on the tetrahedron has no electrode. For clarity of illustration, the following example will assume a tetrahedron receiver with four electrodes.

Figure 6:
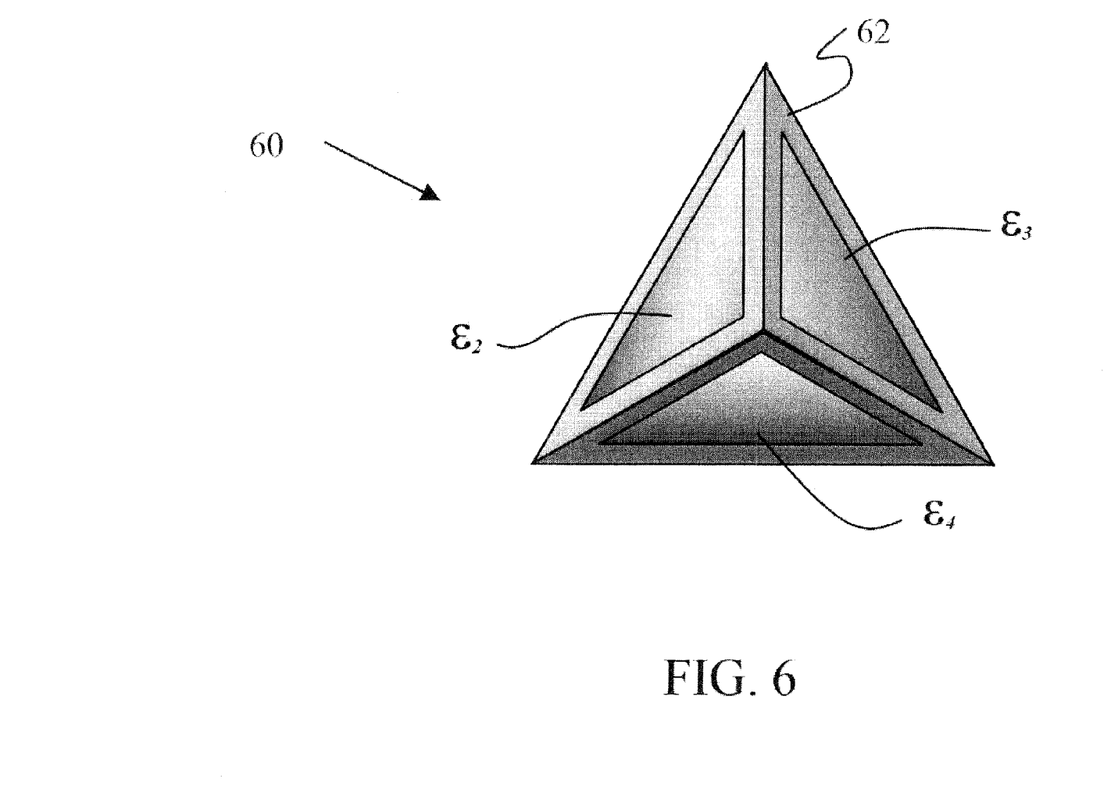
FIG. 6 shows an example tetrahedron-shaped receiver.

As shown in FIG. 6, a receiver 60 in accordance with one embodiment of the present invention includes a tetrahedron-shaped frame 62. Three electrodes $\epsilon_2$, $\epsilon_3$, and $\epsilon_4$ are shown disposed on three of the faces of the tetrahedron frame 62. In this exemplary configuration, a first electrode (not shown) is disposed on the face of the tetrahedron frame 62 facing the bottom of the ocean, and the z axis is defined as vertical from the sea bottom. In this configuration, the normal vectors of the 4 faces are given by $$v_1 = (0, 0_2, -1); \tag{7}$$

$$v_2 = (0, -2\sqrt{2}/3, 1/3); \tag{8}$$

$$v_3 = (\sqrt{2/3}, \sqrt{2}/3, 1/3); \tag{9}$$

$$v_4 = (-\sqrt{2/3}, \sqrt{2}/3, 1/3). \tag{10}$$

As noted above, the signals measured with electrodes on the four surfaces of the tetrahedron can be corrected with a three-dimensional coordinate system (e.g., a Cartesian coordinate system) by using matrices that correlate the orientations of the four surfaces with the three orthogonal vectors in the 3D coordinate system. For the exemplary receiver 60, there are $4!/(4-3)!3! = 4$ different matrices M, resulting from the 4 combinations of the 4 electrodes, each combination including 3 electrodes:

$$M_{1,2,3} = \begin{bmatrix} 0 & 0 & 1 \\ 0 & \frac{2\sqrt{2}}{3} & -\frac{1}{3} \\ -\sqrt{\frac{2}{3}} & -\frac{\sqrt{2}}{3} & -\frac{1}{3} \end{bmatrix}; \tag{11}$$

$$M_{1,2,4} = \begin{bmatrix} 0 & 0 & 1 \\ 0 & \frac{2\sqrt{2}}{3} & -\frac{1}{3} \\ \sqrt{\frac{2}{3}} & -\frac{\sqrt{2}}{3} & -\frac{1}{3} \end{bmatrix}; \tag{12}$$

$$M_{1,3,4} = \begin{bmatrix} 0 & 0 & 1 \\ -\sqrt{\frac{2}{3}} & -\frac{\sqrt{2}}{3} & -\frac{1}{3} \\ \sqrt{\frac{2}{3}} & -\frac{\sqrt{2}}{3} & -\frac{1}{3} \end{bmatrix}; \tag{13}$$

$$M_{2,3,4} = \begin{bmatrix} 0 & \frac{2\sqrt{2}}{3} & -\frac{1}{3} \\ -\sqrt{\frac{2}{3}} & -\frac{\sqrt{2}}{3} & -\frac{1}{3} \\ \sqrt{\frac{2}{3}} & -\frac{\sqrt{2}}{3} & -\frac{1}{3} \end{bmatrix}; \tag{14}$$

The inverse matrices can be obtained as:

$$M_{1,2,3}^{-1} = \begin{bmatrix} -\frac{\sqrt{3}}{2\sqrt{2}} & -\frac{\sqrt{3}}{2\sqrt{2}} & -\sqrt{\frac{3}{2}} \\ \frac{1}{2\sqrt{2}} & \frac{3}{2\sqrt{2}} & 0 \\ 1 & 0 & 0 \end{bmatrix}; \theta_{1,2,3} = (\vartheta_1, \vartheta_2, \vartheta_3) \tag{15}$$

$$M_{1,2,4}^{-1} = \begin{bmatrix} \frac{\sqrt{3}}{2\sqrt{2}} & \frac{\sqrt{3}}{2\sqrt{2}} & \sqrt{\frac{3}{2}} \\ \frac{1}{2\sqrt{2}} & \frac{3}{2\sqrt{2}} & 0 \\ 1 & 0 & 0 \end{bmatrix}; \theta_{1,2,4} = (\vartheta_1, \vartheta_2, \vartheta_4) \quad (16)$$

$$M_{1,3,4}^{-1} = \begin{bmatrix} 0 & \frac{-\sqrt{3}}{2\sqrt{2}} & \frac{\sqrt{3}}{2\sqrt{2}} \\ \frac{-1}{\sqrt{2}} & \frac{-3}{2\sqrt{2}} & \frac{-3}{2\sqrt{2}} \\ 1 & 0 & 0 \end{bmatrix}; \theta_{1,3,4} = (\vartheta_1, \vartheta_3, \vartheta_4) \quad (17)$$

$$M_{2,3,4}^{-1} = \begin{bmatrix} 0 & \frac{-\sqrt{3}}{2\sqrt{2}} & \frac{\sqrt{3}}{2\sqrt{2}} \\ \frac{1}{\sqrt{2}} & \frac{-1}{2\sqrt{2}} & \frac{-1}{2\sqrt{2}} \\ -1 & -1 & -1 \end{bmatrix}; \theta_{2,3,4} = (\vartheta_2, \vartheta_3, \vartheta_4) \quad (18)$$

Accordingly, four different expressions of the current may be obtained from:

$$\vartheta_i = S_i/Z_1 A_i, \text{ for } i=1,2,3,4. \quad (19)$$

Then, four different measurements of the electric field E may be derived from:

$$E_r^{i,j,k} = \frac{1}{\sigma} \sum_s M_{i,j,k_{r,s}}^{-1} \theta_{i,j,k}, \quad (20)$$

where i, j, and k represent the three out of four electrodes selected, the summation of s=1-3 is through the three rows of the matrices $M^{-1}$, and r=1-3 correspond to the components in the x, y, and z directions and to the columns of the matrices. The four electric field values for each orthogonal direction may be compared for quality. In another example, the 4 values for each orthogonal vector of the electric field may be averaged. Doing so may make the measurement of the electric field more accurate by eliminating noise caused by motion or by other sources.

Figure 7:
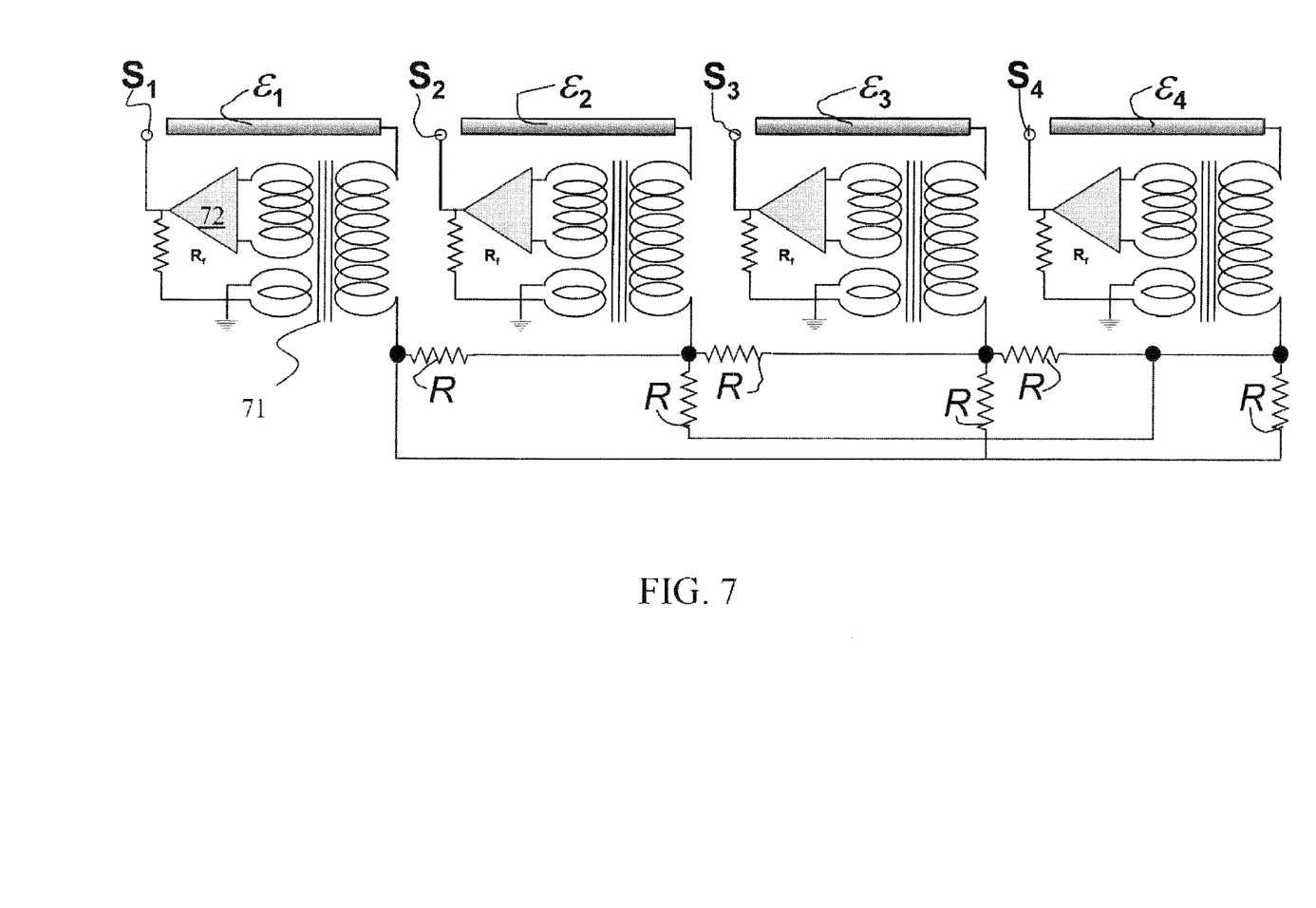
FIG. 7 illustrates one example of a circuit for a tetrahedron-shaped receiver.

An exemplary circuitry for the receiver 60 is illustrated in FIG. 7. One of ordinary skill in the art would appreciate that this is only an example, and other circuitries may also be used. The current flowing into each of the electrodes may be measured, for example, through an inductor 71 and an amplifier 72, as an output voltage $S_1$. The resistor network is uniform in this case, and the resistance R of the common resistor may be determined from $$R = Kd/A\sigma, \quad (21)$$

where d is the length of one side of the tetrahedron, A is the area of each of the electrodes and is assumed to be equal for all four electrodes in this case, σ is the conductivity of the sea water, and K is a dimensionless calibration factor. The value of K may be adjusted such that the negligible perturbation assumption is valid. The desired K value may be estimated from modeling, and verified through calibrations.

The dimensions of the polyhedron receivers may vary depending on specific application requirements. For example, in some tetrahedron receivers (shown as 60 in FIG. 6), the length of one side of the tetrahedron d may be between 1 meter and 2 meters. Assume that d~1.5 m, and that the electrodes can be sized to about 5 cm from the edge of the tetrahedron, then $A \sim 0.87 \times \sqrt{3/8} d^2 \sim 1.2$ m². For a σ~5 S/m. R~K/4. For a K value on the order of 1, the value of the resistance R would be about 0.25 Ohm.

Figure 8:
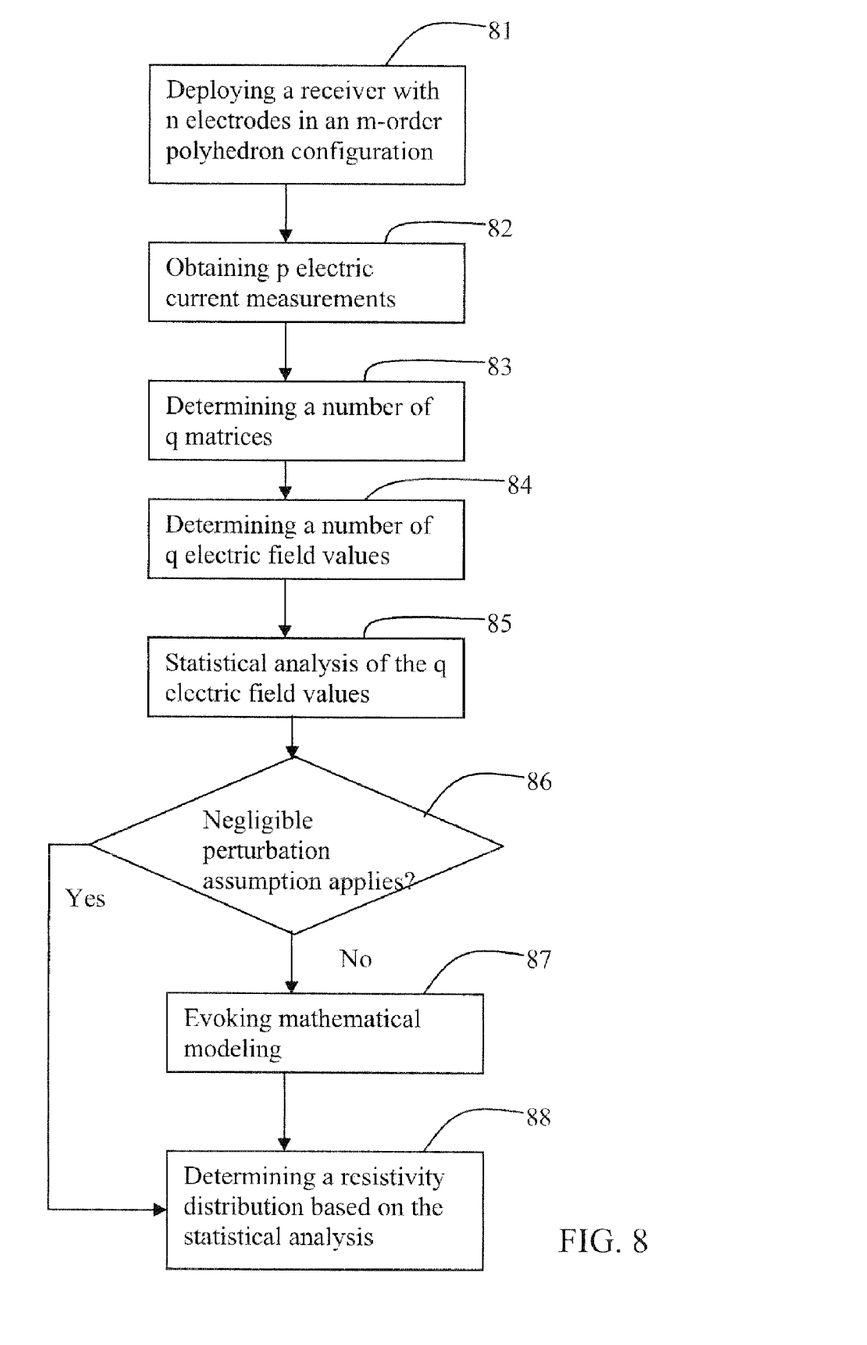
FIG. 8 shows a flowchart of an example method for electromagnetic measurements.

FIG. 8 shows a flowchart of an exemplary method for mapping a subsurface resistivity distribution. In the step 81, a receiver having a total of n electrodes in an m-order polyhedron configuration is deployed in a region of interest. It is noted that n≦m because it is possible that not every one of the m faces of the polyhedron has an electrode disposed on it. A total number of p electric currents are measured using the n electrodes in the step 82. It is noted that p≦n because some of the n electrodes may not provide usable measurements.

A total number of q matrices may be determined from the p measurements in the step 83. It is noted that $q \leq {}^P C_3$ because some singular matrices may not be used, and because some selection of three components from the p measurements may not be sufficient to transform to an orthogonal coordinate system. A number of q electric field values may be obtained in the step 84. These electric field values may be compared, statistically analyzed, or averaged in the step 85 to improve the accuracy and reliability of the data. It is determined in the step 86 whether the NPA applies, depending on the impedance of the circuitry as compared with that of the sea water. If the NPA applies, a resistivity distribution may be straightforwardly obtained in the step 88, as in known to the art. If the NPA does not apply, more complex mathematical modeling step 87 may be needed to solve the resistivity distribution. The mathematical modeling may be performed using a computer running software. The algorithm of the software may include, for example, iteration steps to solve the electric field distribution in the presence of the receiver.

Note that while the method shown in FIG. 8 is illustrated in sequential steps, one of ordinary skill in the art would appreciate that various modifications of this are possible. For example, the determination of NPA condition may not be necessary if the receiver is calibrated to have the same impedance as that of the seawater being displaced.

Disclosed examples may have one or more of the following advantages. Embodiments of the present invention have stable mechanical shapes, e.g., a polyhedron. Such receivers will be less prone to noises caused by the motion. In addition, it would be easier to drop or raise the receiver because of the structural rigidity and the shape. The receivers of the invention will be easier to maintain because they use fewer electrodes. Furthermore, embodiments of the invention may use fewer electrodes to obtain more measurements. The number of measurements may be large enough for quality control, statistical analyses, or averaging to improve the accuracy and reliability of the data or to identify and remove spurious errors.

In addition, disclosed examples, having polyhedron shapes, can be easily integrated with other types of sensors or devices, such as magnetometers or sea water resistivity sensors, within the same structure. Other sensors and devices that are commonly used with CSEM and MT measurements can be easily incorporated into a receiver of the invention. Such sensors and devices, for example, may include acoustic sensors for positioning, anchors and buoyancy devices (glass sphere, syntactic foam, etc.), telemetry, thermometers, gravitometers, magnetic field sensors, and devices for anchor release. These other devices may be incorporated into a polyhedron receiver using any suitable method, and one of ordinary skill in the art would know how these devices may be incorporated into a polyhedron receiver.

It is also easier to pack and transport a polyhedron-shaped receiver as compared with conventional receivers. For example, a tetrahedron takes up about 12% of the volume of a cube having the same side dimension. Furthermore, because the sensors including the antennas may be integrated, the receivers in accordance with embodiments of the present invention may not require the processes of connecting and disconnecting during operations, thereby reducing the operation time and improving the reliability of the receivers.

In addition, some of the examples do not require an NPA, and particularly do not require a regular polyhedron shape, or a precise symmetry in areas and shapes of opposing electrodes. Methods of the invention shift the burden of the instrument design to computation and data analysis. Computer modeling and computing power have advanced significantly in recent years. Therefore, it is easier to have more reliable measurements using embodiments of the invention. With this approach, it also becomes possible to adjust the receiver resistance such that the current density in the receiving elements is enhanced.

While the invention has been described with respect to a limited number of embodiments, those skilled in the art, having benefit of this disclosure, will appreciate that other embodiments can be devised which do not depart from the scope of the invention as disclosed herein.

For example, although in the exemplary configuration illustrated in FIG. 6 the electrodes have surface areas smaller than those of the corresponding faces of the tetrahedron frame 62, in some other configurations the surface areas of an electrode may be the same as that of the surface. In addition, the shapes of the electrodes do not have to follow the shapes of the faces of the tetrahedron frame 62. Rather, both the areas and the shapes of the electrodes may be adjusted to achieve desired electrical properties, e.g., to minimize fringe fields and to satisfy the negligible perturbation assumption. Further, a tetrahedron, or in general a polyhedron receiver may or may not have a regular shape, e.g., the polyhedron may be an irregular polyhedron. Furthermore, in some examples, not every face of the polyhedron has an electrode associated. Yet furthermore, a receiver may include other types of sensors and devices, for example, magnetometers for measuring magnetic fields, a sea water resistivity meter for providing the sea water resistivity data, acoustic sensors for positioning, anchors and buoyancy devices, telemetry, as well as other devices known to a person of ordinary skill in the art.

Although in the examples shown in FIGS. 4 and 6 the receivers have electrodes disposed on surfaces of polyhedrons frames, in accordance with some other examples, the polyhedron frames may be constructed as edges of the polyhedrons while the electrodes are parts or all of the faces of the polyhedrons. In accordance with some examples, an electric current is measured between an electrode and a vertex of a polyhedron; in accordance with some other examples the current may be measured between two electrodes, or among a subset of the electrodes.

Although the exemplary embodiments of the present invention have been described in terms of sea bed logging in the environment of sea water, it may be recognized by a person of ordinary skill in the art that the receivers and methods of the present invention may also be applied to other types of measurements. Accordingly, the scope of the invention should be limited only by the attached claims.

What is claimed is:

1. A receiver for electromagnetic measurements, comprising:
   a polyhedron structure having m faces, wherein $m \geq 5$ and $m \neq 6$;
   n electrodes each disposed on a corresponding one face of the polyhedron structure, wherein $4 \leq n \leq m$ wherein each of the n electrodes is to measure an electrical current affected by a geological structure; and
   at least one circuitry connected to the n electrodes for signal measurement.

2. The receiver of claim 1, wherein the polyhedron structure is a regular polyhedron having a same length on all sides.

3. The receiver of claim 1, wherein the polyhedron structure is an irregular polyhedron with one side having a length different from a length of another side.

4. The receiver of claim 1, further comprising at least one sensor selected from a magnetometer, a resistivity sensor, a thermometer, an impedance sensor, a gravitometer, an accelerometer, an acoustic sensor, and combinations thereof.

5. The receiver of claim 1, wherein the at least one circuitry has an adjustable impedance.

6. The receiver of claim 1, wherein an impedance of the receiver is substantially the same as an impedance of seawater displaced by the receiver.

7. The receiver of claim 1, wherein m=5.

8. The receiver of claim 7, wherein n=4.

9. The receiver of claim 8, wherein the polyhedron structure is a regular tetrahedron having a same length on all sides.

10. A system comprising:
    the receiver of claim 1; and
    a mechanism to transform the measured electrical current from orientations of the m surfaces of each of the polyhedron receivers into a predefined coordinate system.

11. The system of claim 10, wherein the transforming is performed by using matrices that correlate orientations of the m surfaces of each of the polyhedron receivers to the predefined coordinate system.

12. The system of claim 11, wherein the predefined coordinate system is a Cartesian coordinate system.

13. A method, comprising:
    deploying a plurality of polyhedron receivers from a surface vessel;
    towing a source over an area where the polyhedron receivers are located;
    generating a plurality of electromagnetic signals from the source;
    retrieving the plurality of polyhedron receivers;
    downloading electromagnetic sensor data from the plurality of polyhedron receivers, wherein each of the polyhedron receivers have m faces and $m \geq 5$ and $m \neq 6$, and wherein each of the plurality of polyhedron receivers includes n electrodes each disposed on a corresponding one face of the corresponding polyhedron receiver, wherein $4 \leq n \leq m$, and wherein each of the n electrodes is to measure an electrical current affected by a geological structure; and
    transforming the electromagnetic sensor data from orientations of the m faces of each of the polyhedron receivers into a predefined coordinate system.

14. The method of claim 13, wherein at least a portion of the electromagnetic sensor data comprises current density measurements.

15. The method of claim 13, wherein the transforming is performed by using matrices that correlate orientations of the m surfaces of each of the polyhedron receivers to the predefined coordinate system.

16. The method of claim 15, wherein the predefined coordinate system is a Cartesian coordinate system.

* * * * *